United States Patent
Shirouzu et al.

(10) Patent No.: US 6,510,251 B1
(45) Date of Patent: Jan. 21, 2003

(54) WAVELET IMAGE COMPRESSION AND DECOMPRESSION

(75) Inventors: Hiroshi Shirouzu, Fukuoka (JP); Shoko Kitajima, Fukuoka (JP); Koji Yamaguchi, Kasuga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/181,567

(22) Filed: Oct. 29, 1998

(30) Foreign Application Priority Data

Dec. 25, 1997 (JP) .............................. 9-357069

(51) Int. Cl.[7] .............................. G06K 9/36; G06K 9/46
(52) U.S. Cl. ....................................... 382/240; 382/239
(58) Field of Search ................................ 382/239, 240, 382/248; 348/398.1, 408.1, 437.1, 438.1; 375/240.02, 240.11, 240.19; 358/430, 426.02; 341/51, 79

(56) References Cited

U.S. PATENT DOCUMENTS

| | | | |
|---|---|---|---|
| 5,412,741 A | * 5/1995 | Shapiro | ...................... 382/232 |
| 5,598,214 A | 1/1997 | Kondo et al. | ................ 348/414 |
| 5,867,602 A | * 2/1999 | Zandi et al. | ................. 382/240 |

FOREIGN PATENT DOCUMENTS

JP    A8242450    9/1996    ............ H04N/7/30

* cited by examiner

Primary Examiner—Timothy M. Johnson
(74) Attorney, Agent, or Firm—Stevens, Davis Miller & Mosher, LLP

(57) ABSTRACT

In an image data processing system, an insignificant space estimation unit predicts a significant/insignificant space in a high-frequency subband on the basis of a low-frequency subband signal in a wavelet space. A deletion unit deletes data in the insignificant space which is predicted by the insignificant space estimating unit. Here, the data is contained in the high-frequency subband. An error-estimation detection unit detects presence of significant data in the space predicted to be insignificant by the insignificant space estimation unit. An adding unit adds to output data a significance attribute indicating that significant data exists in the space detected by the error-estimation detection unit.

6 Claims, 12 Drawing Sheets

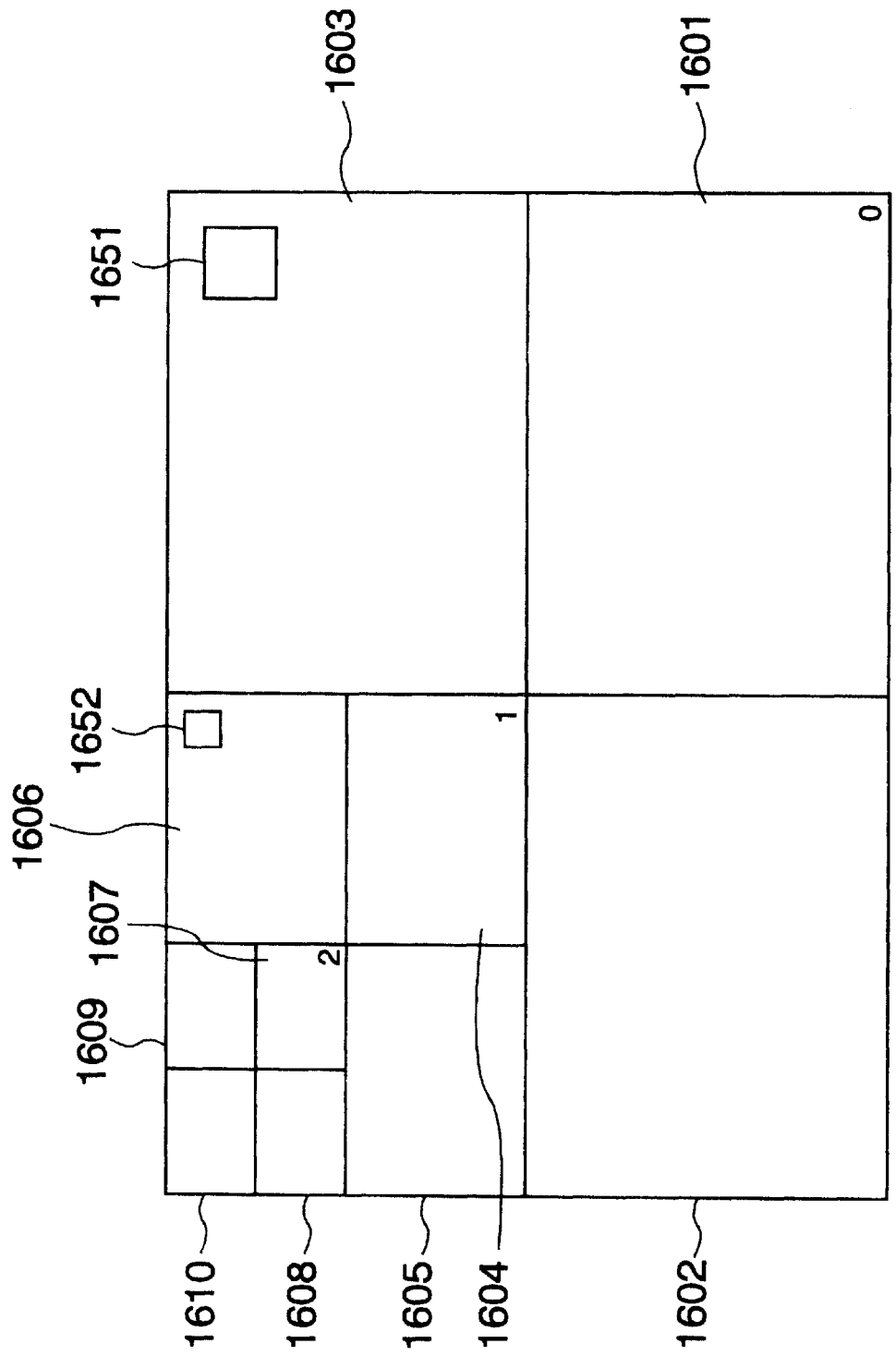

WAVELET IMAGE COMPRESSION AND DECOMPRESSION

BACKGROUND OF THE INVENTION

The present invention relates to an image data processing method and an image data processing system which can be adopted or employed in image data compression processing and the like.

In the high-efficiency coding technique of the image for which the use of communication media and/or recording media is prerequisite, the technique based on discrete cosine transform (DCT) is extensively adopted. However, one of the intrinsic problems inherent to the compression procedure using the DCT can be seen in that when the compression ratio is increased, then block distortions, mosquito noise and the like will become visually perceived, imposing thus limitation on the realizable compression ratio.

Under the circumstances, the novel compression procedures have been developed and proposed in recent years in an attempt for enhancing the compression ratio. Among others, the data compression technique adopting a so-called wavelet transformation, one of the subband encoding techniques, attracts attention. Parenthetically, this technique will hereinafter be referred to as the wavelet. As the wavelet lacks the concept of "block", there is no inter-block distortion generated in the DCT, so that the image quality is visually improved to an appreciable extent.

For having better understanding of the present invention, a conventional wavelet compression/expansion method known heretofore will be described in some detail.

FIG. 7 is a block diagram showing generally and schematically a system configuration of a conventional wavelet image compression system. In the figure, reference numeral 1001 denotes an original image. Reference numerals 1002, 1003 and 1004 denote subband decomposition units for layer-0, layer-1 and layer-2 provided at stages #0, #1 and #2, respectively. Reference numeral 1005 denotes an insignificant-space-estimation deletion unit.

FIG. 11 is a block diagram which shows representatively a structure of the subband decomposition unit shown in FIG. 7. In FIG. 11, reference numeral 1401 denotes a horizontal low-pass filter, 1402 denotes a horizontal high-pass filter, 1403$_1$ and 1403$_2$ denote horizontal down-samplers, 1404$_1$, and 1404$_2$ denote vertical low-pass filters, 1405$_1$ and 1405$_2$ denote vertical high-pass filters, and reference numerals 1406$_1$–1406$_4$ denote vertical down-samplers.

For carrying out the wavelet transformation, the horizontal low-pass filter 1401 receives two-dimensional input data 1455 shown in FIG. 11 to perform the low-frequency filtering operation in the horizontal direction. Thereby, horizontal low-frequency data 1456 is generated. The horizontal high-pass filter 1402 receives the two-dimensional input data 1455 to perform the high-frequency filtering operation in the horizontal direction. Thereby, horizontal high-frequency data 1457 is generated. These data 1456 and 1457 then undergo the horizontal down-sampling operation by the horizontal down-samplers 1403$_1$ and 1403$_2$, respectively. Thereby, horizontal DC separate data 1458 and horizontal H separate data 1459 are generated.

The horizontal DC separate data 1458 then undergoes the filtering operation in the vertical direction by the vertical low-pass filter 1404$_1$, and the vertical high-pass filter 1405$_1$ to generate horizontal DC vertical low-frequency data 1460 and horizontal DC vertical high-frequency data 1461, respectively. Similarly, the horizontal H separate data 1459 undergoes the filtering operation in the vertical direction by the vertical low-pass filter 1404$_2$ and the vertical high-pass filter 1405$_2$ to generate horizontal H vertical low-frequency data 1462 and horizontal H vertical high-frequency data 1463, respectively. These data 1460–1463 then undergo the vertical down-sampling operation by the vertical down-samplers 1406$_1$–1406$_4$ to generate DC separate data 1451, LH separate data 1452, HL separate data 1453 and HH separate data 1454, respectively. In this way, the wavelet transformation can be realized. The subband decomposition processing at the succeeding stage is performed substantially in the same manner.

FIG. 9 is a block diagram showing generally and schematically a system configuration of a conventional wavelet image expansion system. In FIG. 9, reference numeral 1101 denotes an insignificant-space-estimation development unit, 1102 denotes a layer-0 subband synthesis unit, 1103 denotes a layer-1 subband synthesis unit, and 1104 denotes a layer-2 subband synthesis unit. Reference numeral 1105 denotes an expanded image.

FIG. 8 is a block diagram showing generally and schematically an arrangement of the conventional insignificant-space-estimation deletion unit 1005 shown in FIG. 7. In FIG. 8, reference numeral 1201 denotes a layer-1 HL insignificant space estimation module for estimating an HL insignificant space of the layer-1 on the basis of the layer-2 HL space. Reference numeral 1202 denotes a layer-1 LH insignificant space estimation module for estimating an LH insignificant space of the layer-1 on the basis of the layer-2 LH space. Reference numeral 1203 denotes a layer-1 HH insignificant space estimation module for estimating an HH insignificant space of the layer-1 on the basis of the layer-2 HH space. Reference numerals 1204, 1205 and 1206 denote a layer-1 HL insignificant space deletion module, a layer-1 LH insignificant space deletion module, a layer-1 HH insignificant space deletion module, respectively, for deleting the relevant insignificant spaces in the layer-1. Reference numerals 1207, 1208 and 1209 denote layer-0 HL, LH and HH insignificant space estimation modules for estimating relevant insignificant spaces in the layer-0 from the HL, LH and HH insignificant spaces of the layer-1, respectively. Reference numerals 1210, 1211 and 1212 denote HL, LH and HH insignificant space deletion modules for deleting the HL, LH and HH insignificant spaces of the layer-0, respectively.

FIG. 10 is a block diagram showing a structure of the conventional insignificant-space-estimation development unit 1101 shown in FIG. 9. In FIG. 10, reference numeral 1301 denotes a layer-1 HL development module, 1302 denotes a layer-1 LH development module, 1303 denotes a layer-1 HH development module, 1304 denotes a layer-0 HL development module, 1305 denotes a layer-0 LH development module, and 1306 denotes a layer-0 HH development module.

FIG. 12 is a block diagram showing a structure of the subband synthesis unit (see FIG. 9). In FIG. 12, reference numerals 1501$_1$–1501$_4$ denote vertical up-samplers, 1502$_1$, and 1502$_2$ denote vertical low-pass filters, 1503$_1$, and 1503$_2$ denote vertical high-pass filters, 1504$_1$ and 1504$_2$ denote horizontal up-samplers, 1505 denotes a horizontal low-pass filter, and 1506 denotes a horizontal high-pass filter.

Next, description will be directed to the operation of the conventional wavelet compression/expansion system. When the original image 1001 is supplied, the layer-0 subband decomposition unit 1002 shown in FIG. 7 receives the original image data 1061 to perform the first wavelet transformation. Thereby, wavelet data (i.e., layer-0 DC data 1062, layer-0 HL data 1063, layer-0 LH data 1064 and layer-0 HH data 1065) are generated. These wavelet data will hereinafter be referred to as layer-0 wavelet data.

The layer-1 subband decomposition unit 1003 receives the layer-0 wavelet DC data 1062 to perform the second wavelet transformation. Thereby, wavelet data (i.e., layer-1 DC data 1066, layer-1 HL data 1067, layer-1 LH data 1068 and layer-1 HH data 1069) are generated. These wavelet data will hereinafter be referred to as layer-1 wavelet data.

Then, the layer-2 subband decomposition unit 1004 receives the layer-1 DC wavelet data 1066 to perform the third wavelet transformation. Thereby, wavelet data (i.e., layer-2 DC data 1051, layer-2 HL data 1052, layer-2 LH data 1053, and layer-2 HH data 1054) are generated. These wavelet data will hereinafter be referred to as layer-2 wavelet data.

In order that the data compression is performed on the basis of the correlation in the frequency direction among the wavelet data generated in the manners mentioned above, the insignificant-space-estimation deletion unit 1005 receives the wavelet data 1052–1054, 1067–1069, and 1063–1065 which contain no DC component. Then, the insignificant-space-estimation deletion unit 1005 performs the data compression by deleting the insignificant spaces.

FIG. 13 is a view for illustrating the wavelet space. In the figure, reference numerals 1601, 1602 and 1603 denote HH, LH and HL wavelet spaces of the layer-0, respectively. Reference numerals 1604, 1605 and 1606 denote HH, LH and HL wavelet spaces of the layer-1, respectively. Reference numerals 1607, 1608 and 1609 denote HH, LH and HL wavelet spaces of the layer-2, respectively. Reference numeral 1610 denotes a layer-2 DC wavelet space.

It is to be mentioned that the wavelet data exhibits the correlation between the adjacent layers. For example, when a value held by a given area 1652 in the space 1606 that is the wavelet data of the layer-1 is small, then the value held by an analogous area 1651 in the space 1603 that is the wavelet data of layer-0 having the same component can be regarded to be small with a high probability. Further, when the value of the given area 1652 is sufficiently small, the analogous area 1651 in the space 1603 may be defined as having a minimum value. In that case, the data of the analogous area 1651 is unnecessary for the decoding so far as the data of the given area 1652 is available. Accordingly, when the value of the given area 1652 is detected to be smaller than a given threshold value in the coding processing, the analogous area 1651 in the adjacent layer can be decided to be an insignificant space to be deleted from the space 1603. As a result, it can contribute to the improvement of the data compression efficiency. Upon the decoding, the value of the given area 1652 is checked. When it is found that the value of the given area 1652 is not greater than the threshold value referenced at the time of coding, the wavelet space can be reconstituted by embedding the minimum value in the space 1603.

Now, description will be made in concrete of the processing for deleting the insignificant space as executed by the insignificant-space-estimation deletion unit 1005. In FIG. 8, the layer-1 HL insignificant space estimation module 1201 receives the layer-2 HL wavelet data 1052 to perform the threshold value decision. Thereby, the minimum-value-area estimation of the layer-1 HL data 1067 that is the data of the layer lower by one rank than the data 1052 is performed to generate the layer-1 HL insignificant space estimation data 1251. Similarly, the other insignificant space estimation modules 1202 and 1203 receive the relevant wavelet data of the layer-2 (i.e., the layer-2 LH data 1053 and the layer-2 HH data 1054) to perform the minimum-value-area estimation in the data of the one-rank lower layer (i.e., layer-1). Thereby, the layer-1 LH insignificant space estimation data 1252 and the layer-1 HH insignificant space estimation data 1253 are generated.

The layer-1 HL insignificant space deletion module 1204 receives the layer-1 HL insignificant space estimation data 1251 and the layer-1 HL data 1067 to delete the data in the insignificance-estimated area. Thereby, the layer-1 HL compressed data 1055 is generated. In a similar manner, the layer-1 LH insignificant space deletion module 1205 generates the layer-1 LH compressed data 1056 on the basis of the layer-1 LH insignificant space estimation data 1252 and the layer-1 LH data 1068. Further, the layer-1 HH insignificant space deletion module 1206 generates the layer-1 HH compressed data 1057 on the basis of the layer-1 HH insignificant space estimation data 1253 and the layer-1 HH data 1069.

Similarly, the layer-0 insignificant space estimation modules 1207, 1208 and 1209 receive the layer-1 compressed data 1055, 1056 and 1057 to perform the minimum-value-area estimation of the data in the one-rank lower layer (i.e., the layer-0), respectively. Thereby, the layer-0 insignificant space estimation data 1254, 1255 and 1256 are generated. Then, the layer-0 compressed data are generated on the basis of the layer-0 insignificant space estimation data 1254, 1255 and 1256.

Next, description will turn to the operation of the conventional decoder implemented in the form of the wavelet image expansion unit. In FIG. 9, the layer-0 subband synthesis unit 1102 receives the compressed wavelet data of the layer-2 (i.e., the layer-2 DC data 1051, the layer-2 HL data 1052, the layer-2 LH data 1053 and the layer-2 HH data 1054) to perform the reverse wavelet transformation. Thereby, the layer-1 DC expanded data 1158 is generated.

In this conjunction, the reverse wavelet transformation can be realized by means of the vertical p-sampler $1501_1$, shown in FIG. 12 that receives the DC input data 1552 to perform the up-sampling operation in the vertical direction. Thereby, the DC up-sampled data 1556 is generated. Likewise, the vertical up-samplers $1501_2$–$1501_4$ receive the HL input data 1553, the LH input data 1554 and the HH input data 1555 to generate the up-sampled data 1557, 1558 and 1559, respectively.

Subsequently, the vertical low-pass filter $1502_1$ and the vertical high-pass filter $1503_1$ receive the DC up-sampled data 1556 and the HL up-sampled data 1557, respectively, to perform the filtering reverse mapping transformation in the vertical direction. Thereby, the horizontal DC synthesized data 1560 is generated. Likewise, the vertical low-pass filter $1502_2$ and the vertical high-pass filter $1503_2$ receive the LH up-sampled data 1558 and the HH up-sampled data 1559, respectively, to generate the horizontal H synthesized data 1561.

The horizontal up-sampler $1504_1$ receives the horizontal DC synthesized data 1560 to perform the up-sampling operation in the horizontal direction. Thereby, the horizontal DC up-sampled data 1562 is generated. Similarly, the horizontal up-sampler $1504_2$ receives the horizontal H synthesized data 1561 to generate the horizontal H up-sampled data 1563. The horizontal low-pass filter 1505 and the horizontal high-pass filter 1506 receive the horizontal DC up-sampled data 1562 and the horizontal H up-sampled data 1563, respectively, to perform the filtering reverse mapping transformation in the horizontal direction. Thereby, the synthesized data 1551 is generated.

In FIG. 9, the insignificant-space-estimation development unit 1101 receives the data 1052–1060 of the individual layers to decode the data compressed by deleting the insignificant spaces. Thereby, the expanded data 1152–1157 of the individual layers are generated.

Now, concrete description will be made of the decoding of the data compressed by deleting the insignificant spaces. FIG. 10 is a block diagram showing concretely the structure of the insignificant-space-estimation development unit 1101. In FIG. 10, the insignificant space estimation module 1201 receives the layer-2 HL data 1052 to estimate the minimum value area in the data of the one-rank lower layer (i.e., the layer-1 HL compressed data 1055). Thereby, the HL insignificant space development/estimation data 1351 is generated. Similarly, the insignificant space estimation modules 1202 and 1203 receive the component data of the layer-2 (i.e., the layer-2 LH data 1053 and the layer-2 HH data 1054) to estimate the minimum value areas in the data of the respective one-rank lower layer. Thereby, the layer-1 LH insignificant space development/estimation data 1352 and the layer-1 HH insignificant space development/estimation data 1353 are generarted.

The layer-1 HL development module 1301 receives the layer-1 HL insignificant space development/estimation data 1351 and the layer-1 HL compressed data 1055 to embed the minimum value in the insignificance-estimated area. Thereby, the HL expanded data 1152 is generated. Similarly, the layer-1 LH development module 1302 generates the LH expanded data 1153 by embedding the minimum value in the insignificance-estimated area on the basis of the layer-1 LH compressed data 1056 and the layer-1 LH insignificant space development/estimation data 1352. The layer-1 HH development module 1303 generates the HH expanded data 1154 by embedding the minimum value in the insignificance-estimated area on the basis of the layer-1 HH compressed data 1057 and the layer-1 HH insignificant space development/estimation data 1353.

Then, the layer-0 HL insignificant space estimation module 1207 receives the layer-1 HL expanded data 1152 to perform the threshold value decision for estimating the minimum value area in the data of the one-rank lower layer (i.e., the layer-0 HL compressed data 1058). Thereby, the layer-0 HL insignificant space development/estimation data 1354 is generated. Similarly, the layer-0 LH insignificant space estimation module 1208 receives the component data of the layer-1 (i.e., the layer-1 LH expanded data 1153) to estimate the minimum value area in the data of the one-rank lower layer. Thereby, the layer-0 LH insignificant space development/estimation data 1355 is generated. The layer-0 HH insignificant space estimation module 1209 receives the component data of the layer-1 (i.e., the layer-1 HH expanded data 1154) to estimate the minimum value area in the data of the one-rank lower layer. Thereby, the layer-0 HH insignificant space development/estimation data 1356 is generated.

Finally, the layer-0 HL development module 1304 receives the layer-0 HL insignificant space development/estimation data 1354 and the layer-0 HL compressed data 1058 to embed the minimum value in the insignificance-estimated area. Thereby, the layer-0 HL expanded data 1155 is generated. Similarly, the layer-0 LH development module 1305 generates the layer-0 LH expanded data 1156 by embedding the minimum value to the insignificance-estimated area on the basis of the layer-0 LH compressed data 1059 and the layer-0 LH insignificant space development/estimation data 1355. The layer-0 HH development module 1306 generates the layer-0 HH expanded data 1157 by embedding the minimum value to the insignificance-estimated area on the basis of the layer-0 HH compressed data 1060 and the layer-0 HH insignificant space development/estimation data 1356. In this way, the decoding of the wavelet data is carried out.

In FIG. 9, reference numeral 1158 designates layer-1 DC expanded data, and 1159 designates layer-0 DC expanded data. Reference numeral 1151 designates the expanded image data. The layer-1 subband synthesis unit 1103 receives the wavelet data 1158, 1152, 1153 and 1154 of the layer-1 to generate the layer-0 DC expanded data 1159. Further, the layer-2 subband synthesis unit 1104 receives the wavelet data 1159, 1155, 1156 and 1157 of the layer-0 to generate the expanded image data 1151. Through the procedure described above, the image data can be expanded.

However, the conventional image data processing system suffers shortcomings that the accuracy in predicting or estimating the insignificant area is relatively low, incurring degradation in the image compression efficiency. More specifically, for a signal having only high frequency components, there may arise such situation that the high-frequency components are estimated as the insignificant spaces because of unavailability of the correlation between the low-frequency components and the high-frequency components. Thus, there are some cases where the degradation with regard to the resolution of the image is occurred.

SUMMARY OF THE INVENTION

It is an object of the present invention to provide an image data processing method and an image data processing system which can ensure the enhanced accuracy for the estimation of the insignificant space as well as the improvement for the image data compression efficiency.

In order to achieve the object, the present invention allows the insignificant space estimation of the high-frequency components with high accuracy and reliability by deleting an insignificant space from data with high accuracy in the following manner. Upon the prediction of a space in which significant data of high-frequency data after the subband division is exists, in the case that any significant data exists in the space estimated as an insignificant space, a significance attribute indicating the presence of insignificant data in the insignificance-decided space corresponding to the space in which it exists. Then, the insignificant space to be compressed is re-estimated on the basis of a threshold value of the insignificance-decided space added the significance attribute and the significance attribute.

The first aspect of the present invention is a coding or encoding apparatus for an image data processing system, which comprises: means for performing wavelet transformation; means for estimating and deleting an insignificant space to be subjected to code-deletion on the basis of a threshold decision for the insignificant space and significance attribute indicating presence of significant data; means for detecting the presence of the significant data in the space estimated as the insignificant space by the estimated means; and means for adding the significance attribute to the insignificance-decided space corresponding to the space in which the significant data exists. According to the first aspect, the accuracy of the prediction on the basis of the frequency correlation upon the coding can be enhanced. Thereby, the image quality degradation due to the compression can be prevented without increasing the amount of codes upon the coding.

The second aspect of the present invention is a decoding apparatus for an image data processing system, which comprises: means for estimating an insignificant space to be subjected to code-deletion on the basis of a threshold comparison decision of an insignificance-decided space and a significance attribute indicating presence of significant data; means for embedding an insignificant data in the space decided to be insignificant by the estimating means and for developing data generated by the coding method mentioned previously in the areas other than the insignificant space; and means for performing a reverse wavelet transformation. According to the second aspect, the accuracy of the prediction on the basis of the frequency correlation upon the decoding can be enhanced. Thereby, the image quality degradation of the expanded image can be prevented without increasing the amount of codes upon the coding.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 13 is a view for illustrating wavelet space.

DESCRIPTION OF THE PREFERRED EMBODIMENTS

Figure 1:
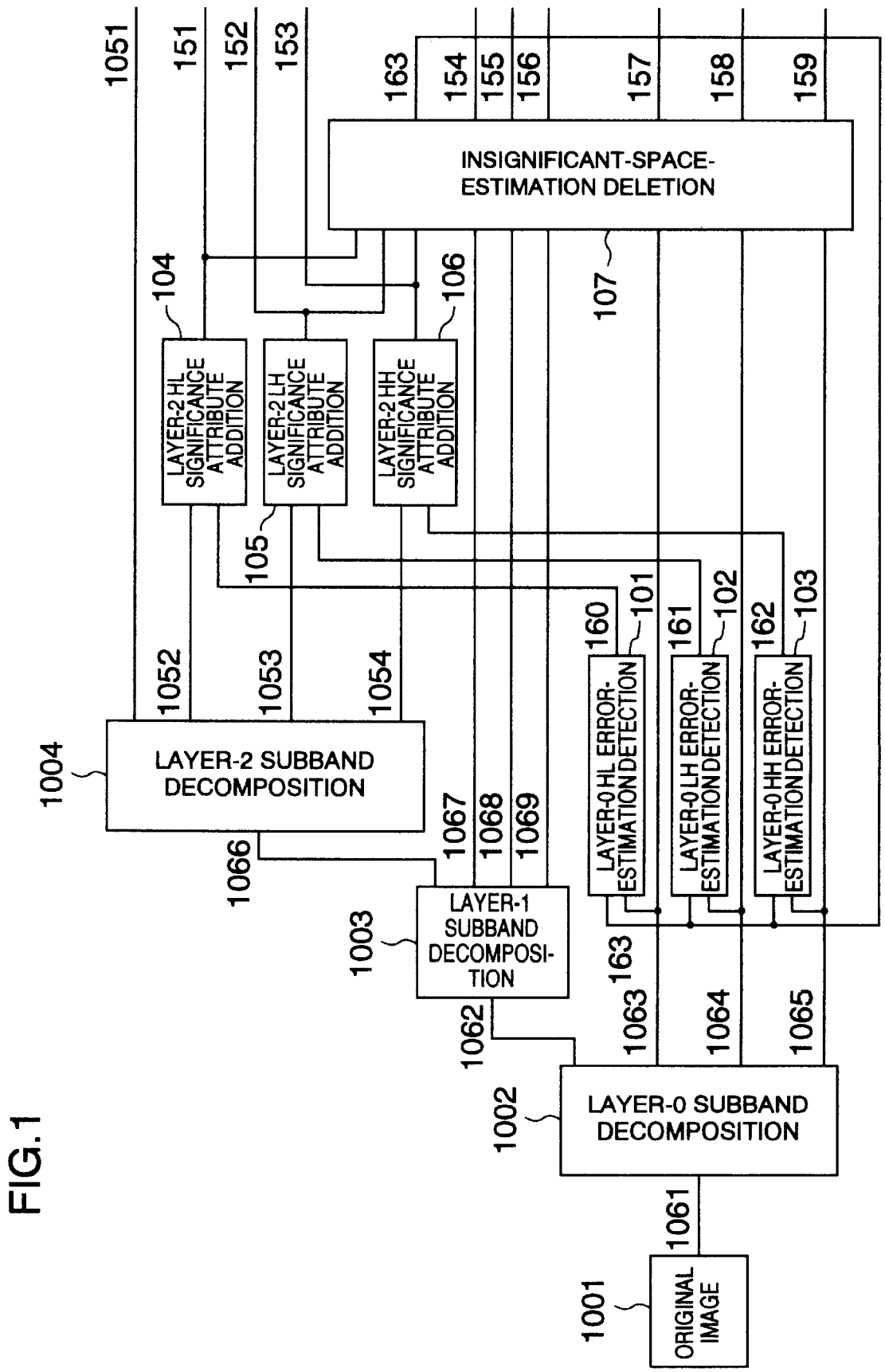
FIG. 1 is a block diagram showing generally and schematically a system configuration of a wavelet image compression system according to an embodiment of the present invention.

Now, an image data processing method and an image data processing system for carrying out the same according to the present invention will be described in conjunction with preferred embodiments thereof by reference to the drawings. Incidentally, components or parts same as or equivalent to those mentioned hereinbefore in conjunction with the description of the conventional techniques made by reference to FIGS. 7 to 12 are designated by like reference characters and repeated description in detail thereof is omitted.

FIG. 1 is a block diagram showing a system configuration of a wavelet image compression system according to an embodiment of the present invention. In FIG. 1, reference numeral 1001 designates an original image. Reference numeral 1002 denotes a subband decomposition unit for performing a subband decomposition at a first stage (layer-0). Hereinafter, this subband decomposition unit will be referred to as the layer-0 subband decomposition unit. Reference numeral 1003 denotes a subband decomposition unit for performing a subband decomposition at a succeeding stage (layer-1). Hereinafter, this subband decomposition unit will be referred to as the layer-1 subband decomposition unit. Reference numeral 1004 denotes a subband decomposition unit for performing a subband decomposition at the final stage (layer-2). Hereinafter, this subband decomposition unit will be referred to as the layer-2 subband decomposition unit. Reference numeral 1061 designates original image data. The original image data 1061 is first supplied to the layer-0 subband decomposition unit 1002 to be separated into subbands.

Reference numerals 1062–1065 designate subband data outputted from the layer-0 subband decomposition unit 1002. More specifically, reference numeral 1062 designates layer-0 DC data, 1063 designates layer-0 HL data, 1064 designates layer-0 LH data, and 1065 designates layer-0 HH data. The layer-0 DC data 1062 is sent to the succeeding layer-1 subband decomposition unit 1003.

Reference numeral 101 denotes a layer-0 HL error-estimation detection module, 102 denotes a layer-0 LH error-estimation detection module, and 103 denotes a layer-0 HH error-estimation detection module. These error-estimation detection modules are so designed as to detect a portion or area estimated erroneously as an insignificant space, and to output data indicating the presence of significant data. This data will hereinafter be referred to as the significance attribute data. Reference numeral 160 designates layer-0 HL significance attribute data outputted from the layer-0 HL error-estimation detection module 101. Reference numeral 161 designates layer-0 LH significance attribute data outputted from the layer-0 LH error-estimation detection module 102. Reference numeral 162 designates layer-0 HH significance attribute data outputted from the layer-0 HH error-estimation detection module 103.

Reference numerals 1066–1069 designate data outputted from the layer-1 subband decomposition unit 1003. More specifically, reference numeral 1066 designates layer-1 DC data, 1067 designates layer-1 HL data, 1068 designates layer-1 LH data, and 1069 designates layer-1 HH data. The layer-1 DC data 1066 is sent to the succeeding layer-2 subband decomposition unit 1004.

Reference numeral 1051 designates DC data outputted from the layer-2 subband decomposition unit 1004. This data will be referred to as the layer-2 DC data. Reference numerals 1052, 1053 and 1054 designate layer-2 HL data, layer-2 LH data and layer-2 HH data outputted from the layer-2 subband decomposition unit 1004, respectively. Reference numeral 151 designates layer-2 HL compressed data, 152 designates layer-2 LH compressed data, and 153 designates layer-2 HH compressed data.

Reference numeral 104 denotes a layer-2 HL significance attribute addition module which is so designed as to add to the layer-2 HL data 1052 a significance attribute indicating that significant data exists in the portion decided by the layer-0 HL error-estimation detection module 101 as having been erroneously estimated. The layer-2 HL data 1052 with the significance attribute is outputted as layer-2 HL compressed data 151 from the layer-2 HL significance attribute addition module 104. Similarly, reference numeral 105 denotes a layer-2 LH significance attribute addition module which is so designed as to add to the layer-2 LH data 1053 a significance attribute indicating that significant data exists in the portion decided by the layer-0 LH error-estimation detection module 102 as having been erroneously estimated. The layer-2 LH data 1053 with the significance attribute is outputted as layer-2 LH compressed data 152 from the layer-2 LH significance attribute addition module 105. Reference numeral 106 denotes a layer-2 HH significance attribute addition module which is designed so as to add to the layer-2 HH data 1054 a significance attribute indicating that significant data exists in the portion decided by the layer-0 HH error-estimation detection module 103 as having been erroneously estimated. The layer-2 HH data 1054 with the significance attribute is outputted as layer-2 HH compressed data 153 from the layer-2 HH significance attribute addition module 106.

Reference numeral 107 denotes an insignificant-space-estimation deletion unit which estimates an insignificant space on the basis of the attribute-affixed data and then delete the data in the insignificant space. The insignificant-space-estimation deletion unit 107 outputs an insignificance decision signal 163. Reference numeral 154 designates layer-1 HL compressed data, 155 designates layer-1 LH compressed data, and 156 designates layer-1 HH compressed data. Reference numeral 157 designates layer-0 HL compressed data, 158 designates layer-0 LH compressed data, and 159 designates layer-0 HH compressed data. These compressed data are outputted from the insignificant-space-estimation deletion unit 107.

Figure 2:
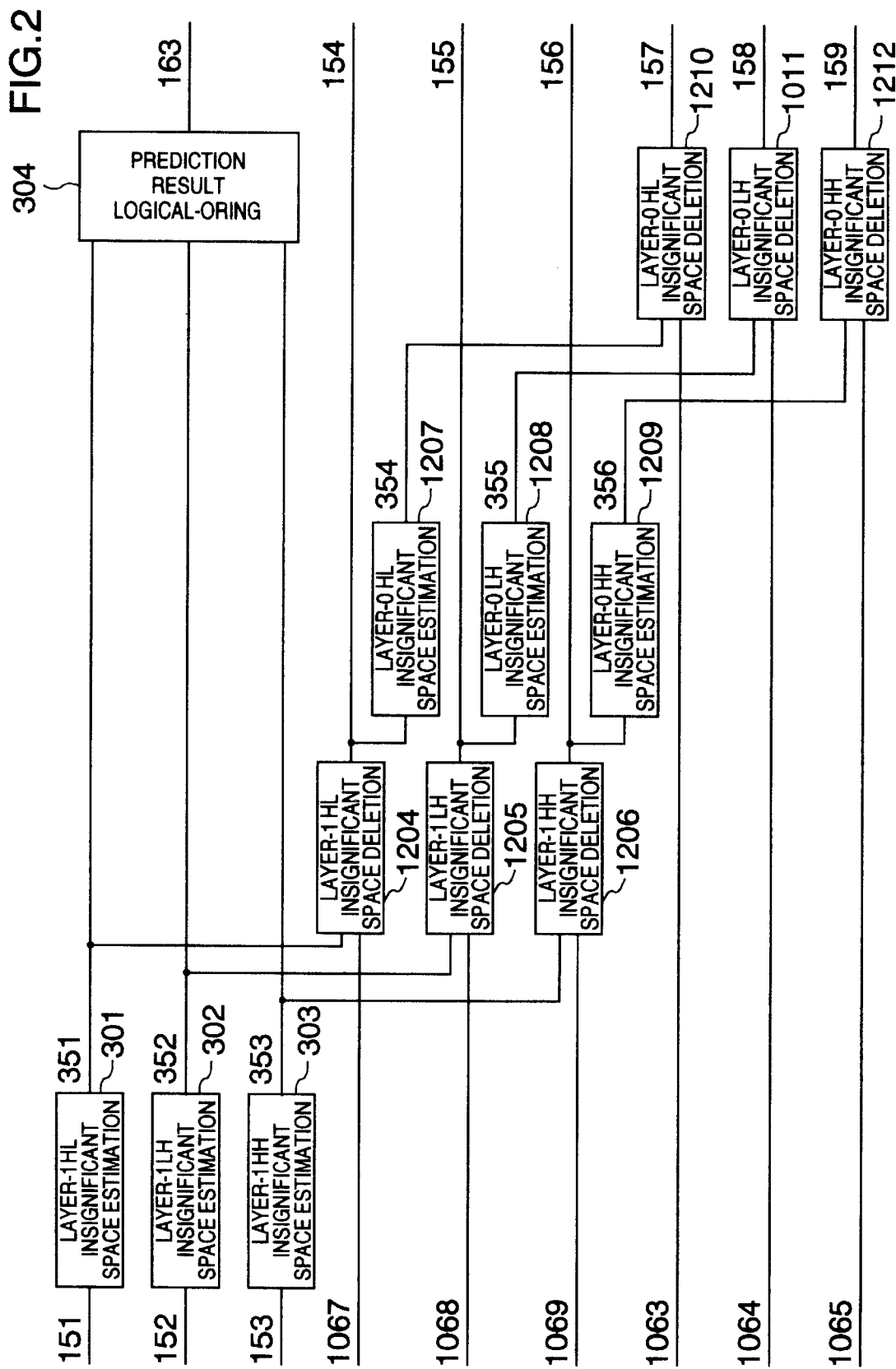
FIG. 2 is a block diagram showing schematically a structure of an insignificant-space-estimation deletion unit according to an embodiment of the present invention.

FIG. 2 is a block diagram showing schematically a structure of the insignificant-space-estimation deletion unit 107 according to the embodiment of the present invention. In FIG. 2, reference numeral 301 denotes a layer-1 HL insignificant space estimation module for estimating the layer-1 HL insignificant space on the basis of the layer-2 HL attribute-affixed data. Reference numeral 302 denotes a layer-1 LH insignificant space estimation module for estimating the layer-1 LH insignificant space on the basis of the layer-2 LH attribute-affixed data. Reference numeral 303 denotes a layer-1 HH insignificant space estimation module for estimating the layer-1 HH insignificant space on the basis of the layer-2 HH attribute-affixed space. Reference numeral 351 designates layer-1 HL insignificant space estimation data outputted from the insignificant space estimation module 301. Reference numeral 352 designates layer-1 LH insignificant space estimation data outputted from the insignificant space estimation module 302. Reference numeral 353 designates layer-1 HH insignificant space estimation data outputted from the insignificant space estimation module 303.

Reference numeral 304 denotes an estimation-result logical-ORing module for logically ORing the insignificant space estimation data 351, 352 and 353 of the subbands HL, LH and HH of the layer-1. Thus, for the area in any one of the subbands HL, LH and HH which is estimated as being insignificant, the estimation-result logical-ORing module 304 outputs an insignificance decision signal 163 indicating that the above-mentioned area is the insignificant space.

Reference numeral 1204 denotes a layer-1 HL deletion module for deleting data in the area estimated to be the insignificant space from the layer-1 HL data 1067. The layer-1 HL deletion module 1204 receives the layer-1 HL insignificant space estimation data 351 and the layer-1 HL data 1067, and then deletes the data of the insignificance-estimated area indicated by the layer-1 HL insignificant space estimation data 351 from the layer-1 HL data 1067. Thereby, layer-1 HL compressed data 154 is outputted from the layer-1 HL deletion module 1204. Reference numeral 1205 designates a layer-1 LH deletion module for deleting data in the area estimated as the insignificant space from the layer-1 LH data 1068. The layer-1 LH deletion module 1205 receives the layer-1 LH insignificant space estimation data 352 and the layer-1 LH data 1068, and then deletes the data of the insignificance-estimated area indicated by the layer-1 LH insignificant space estimation data 352. Thereby, layer-1 LH compressed data 155 is outputted from the layer-1 LH deletion module 1205. Further, reference numeral 1206 designates a layer-1 HH deletion module for deleting data in the area estimated to be the insignificant space from the layer-1 HH data 1069. The layer-1 HH deletion module 1206 receives the layer-1 HH insignificant space estimation data 353 and the layer-1 HH data 1069, and then deletes the data of the insignificance-estimated area indicated by the layer-1 HH insignificant space prediction data 353. Thereby, layer-1 HH compressed data 156 is outputted from the layer-1 HH deletion module 1206.

Reference numeral 1207 denotes an insignificant space estimation module for estimating the insignificant space in the layer-0 HL space on the basis of the layer-1 HL space. Reference numeral 1208 denotes an insignificant space estimation module for estimating the insignificant space in the layer-0 LH space on the basis of the layer-1 LH space. Reference numeral 1209 denotes an insignificant space estimation module for estimating the insignificant space in the layer-0 HH space on the basis of the layer-1 HH space. Reference numeral 354 designates layer-0 HL insignificant space estimation data, 355 designates layer-0 LH insignificant space estimation data, and 356 designates layer-0 HH insignificant space estimation data.

Reference numeral 1210 denotes a layer-0 HL deletion module, 1211 denotes a layer-0 LH deletion module, and 1212 denotes a layer-0 HH deletion module. These modules 1210, 1211, 1212 delete data of the areas estimated as the insignificant spaces from the relevant data 1063, 1064 and 1065 of the layer-0, respectively, in the similar manner as the layer-1 deletion modules 1204, 1205 and 1206 mentioned above.

Figure 3:
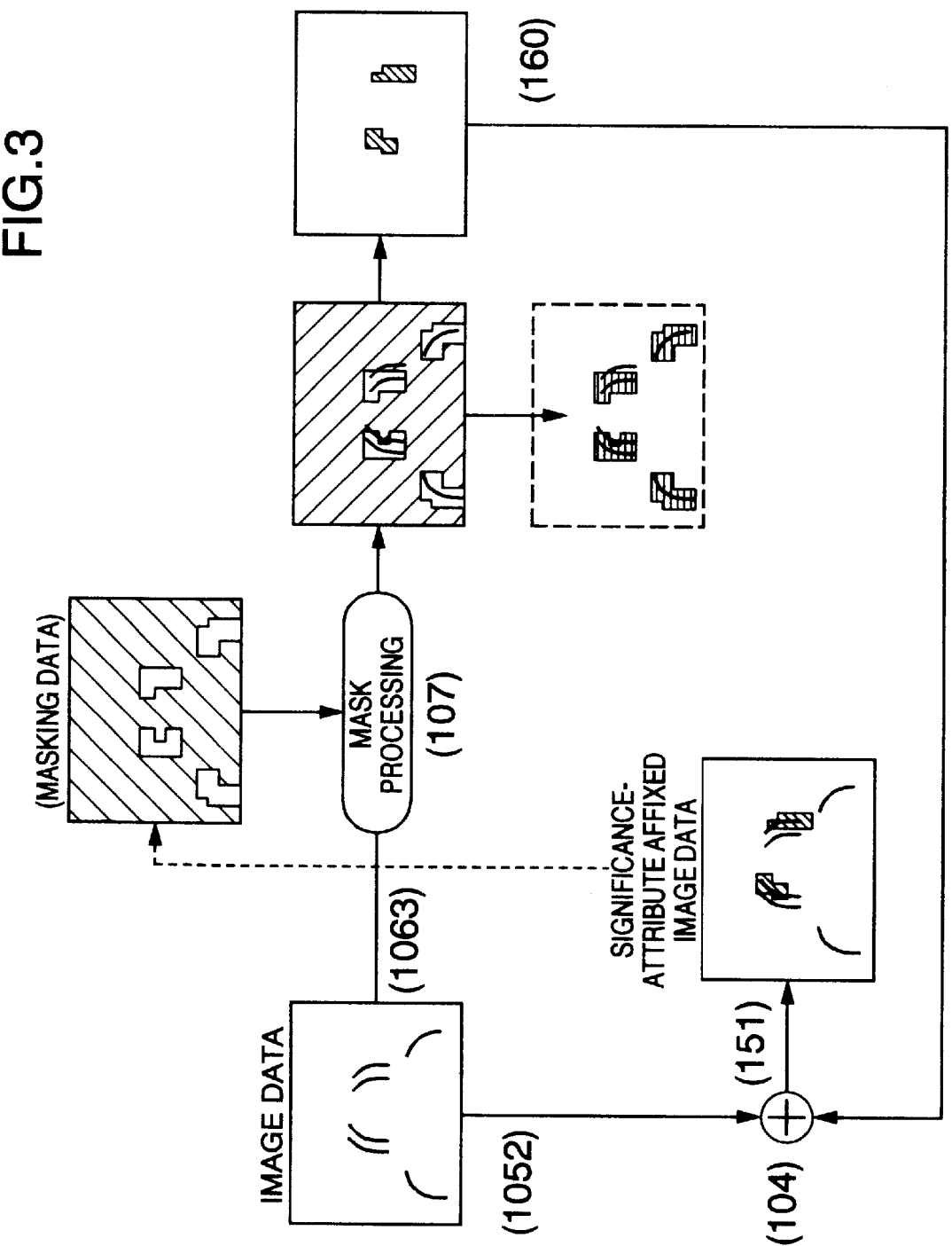
FIG. 3 is a view for illustrating detection of significant data in an insignificance-estimated space and addition of significance attribute according to an embodiment of the present invention.

According to the aspect of the present invention, in the case where some significant data exists in the space estimated as being the insignificant space, such processing is performed that the significance attribute indicating the presence of the significant data is added to the estimated insignificant space. More specifically, the layer-0 HL error-estimation detection module 101 checks the layer-0 HL data 1063 on the basis of the insignificance decision signal 163 to output the layer-0 HL significance attribute data 160. The layer-0 LH error-estimation detection module 102 checks the layer-0 LH data 1064 on the basis of the 20 insignificance decision signal 163 to output the layer-0 LH significance attribute data 161. Further, the layer-0 HH error-estimation detection module 103 checks the layer-0 HH data 1065 on the basis of the insignificance decision signal 163 to output layer-0 HH significance attribute data 162. When the significance attribute data 160-162 has been asserted (decided to be active), the data inputted to the relevant significance attribute addition modules 104-106 are affixed with the significance attribute. On the other hand, in the case where the individual significance attribute data mentioned above has been negated (decided to be inactive), no significance attribute is added. Consequently, the data inputted to the significance attribute addition modules 104–106 are outputted as the compressed data 151–153. The detection of the significant data and the addition of the significance attribute are illustrated in FIG. 3.

Figure 4:
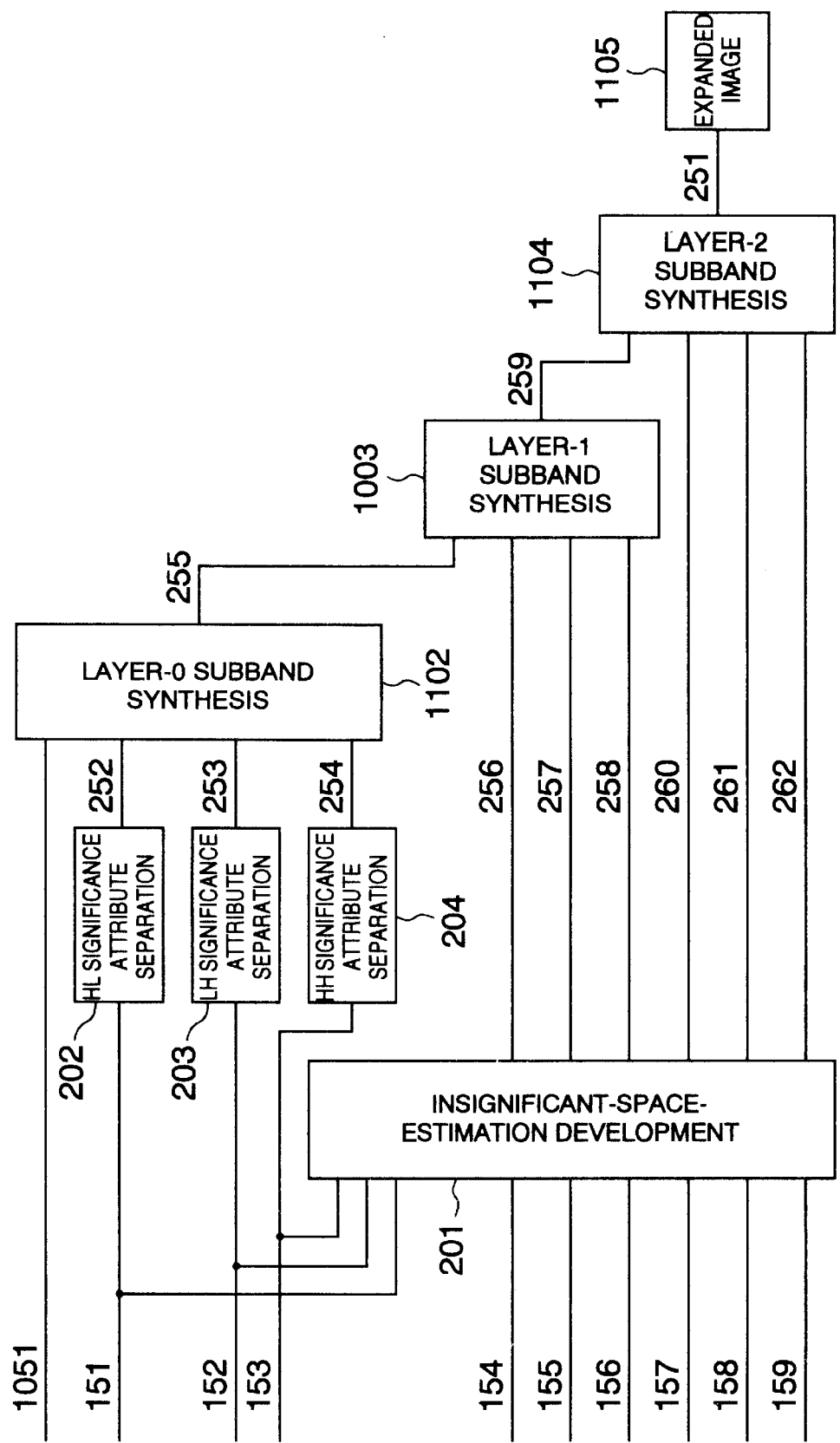
FIG. 4 is a block diagram showing schematically a structure of a wavelet image expansion unit according to an embodiment of the present invention.

FIG. 4 is a block diagram showing schematically a structure of a wavelet image expansion unit according to an embodiment of the present invention. Reference numeral 201 denotes an insignificant-space-estimation development unit, 202 denotes an HL significance attribute separating module, 203 denotes an LH significance attribute separating module, 204 denotes an HH significance attribute separating module, 1102 denotes a layer subband synthesis unit, 1103 denotes a layer-1 subband synthesis unit, 1104 denotes a layer-2 subband synthesis unit, and 1105 denotes an expanded image.

Reference numeral 252 designates layer-2 HL significance-attribute-eliminated data, 253 designates layer-2 LH significance-attribute-eliminated data, and 254 designates layer-2 HH significance-attribute-eliminated data. Reference numeral 255 designates layer-1 DC expanded data.

Reference numeral 256 designates layer-1 HL expanded data, 257 designates layer-1 LH expanded data, 258 designates layer-1 HH expanded data, and 259 designates layer-0 DC expanded data. Reference numeral 260 designates layer-0 HL expanded data, 261 designates layer-0 LH expanded data, and 262 designates layer-0 HH expanded data. Reference numeral 251 designates expanded image data.

Figure 5:
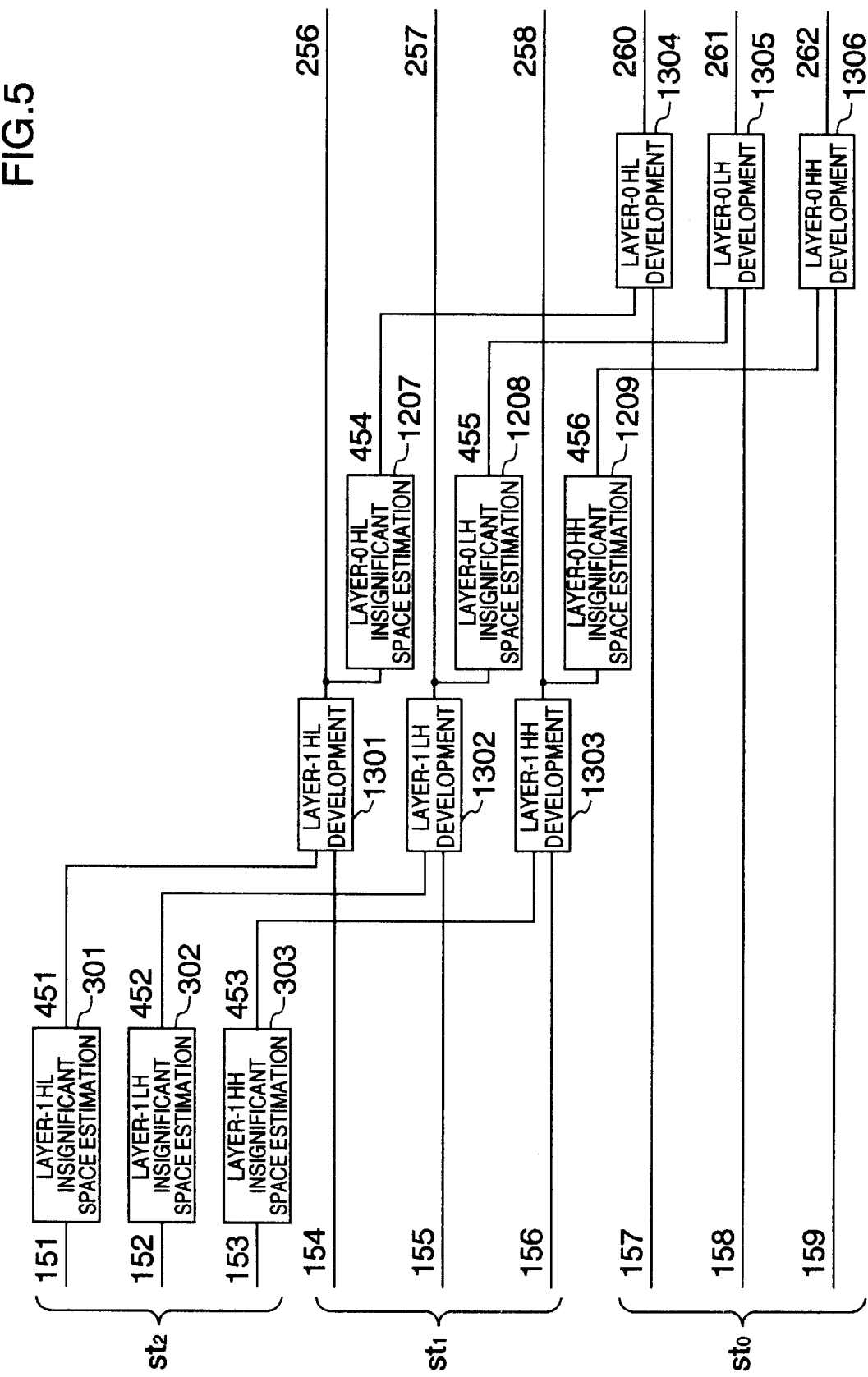
FIG. 5 is a block diagram showing schematically a structure of an insignificant-space-estimation development unit according to an embodiment of the present invention.

FIG. 5 is a block diagram showing a structure of the insignificant-space-estimation development unit according to the embodiment of the present invention. Reference numeral 451 designates layer-1 HL insignificant space development/estimation data, 452 designates layer-1 LH insignificant space development/estimation data, and 453 designates layer-1 HH insignificant space development/estimation data. The insignificant space estimation modules 301–303 are implemented similarly to those shown in FIG. 2. Reference numeral 454 designates layer-0 HL insignificant space development/estimation data, 455 designates layer-0 LH insignificant space development/estimation data, and 456 designates layer-0 HH insignificant space development/estimation data. Reference numeral 1301 denotes a layer-1 HL development module, 1302 denotes a layer-1 LH development module, 1303 denotes a layer-1 HH development module, 1304 denotes a layer-0 HL development module, 1305 denotes a layer-0 LH development module, and 1306 denotes a layer-0 HH development module.

Figure 6:
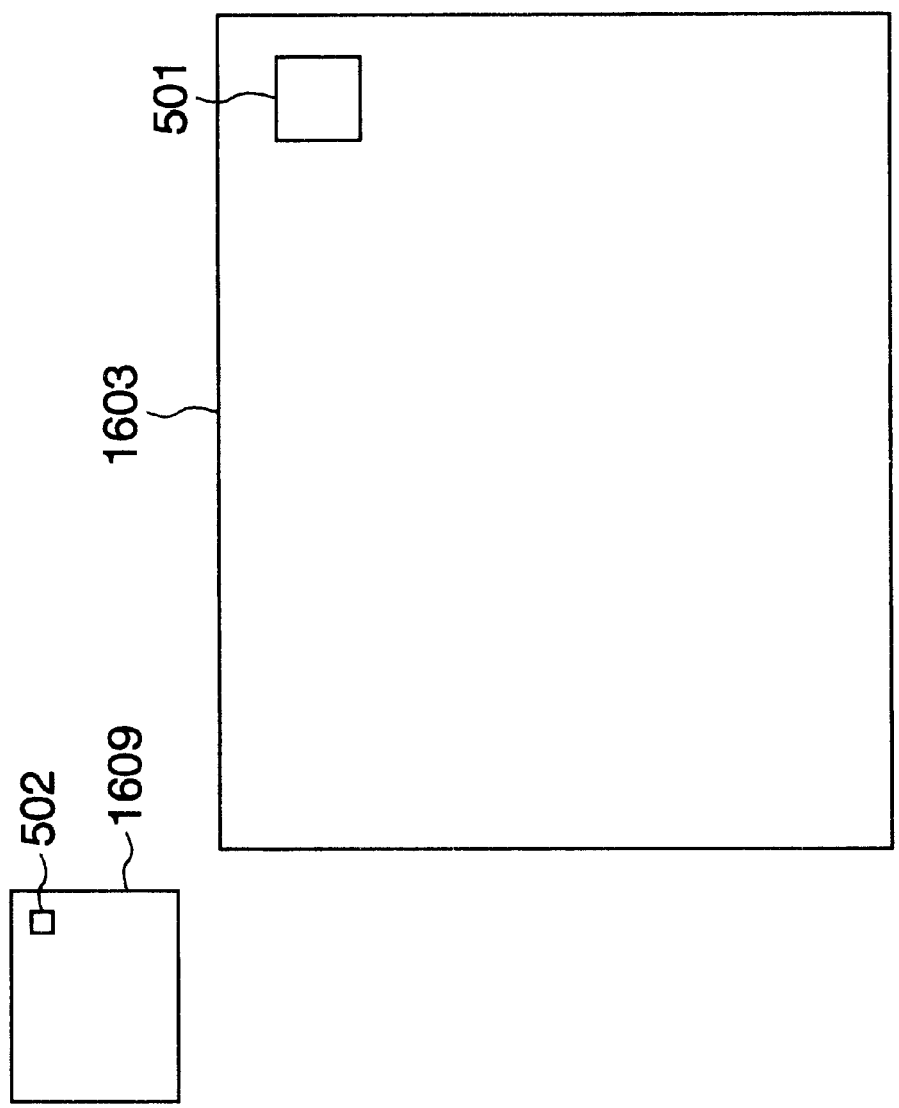
FIG. 6 is a view for illustrating operation of a significance attribute addition module according to an embodiment of the present invention.
Figure 7:
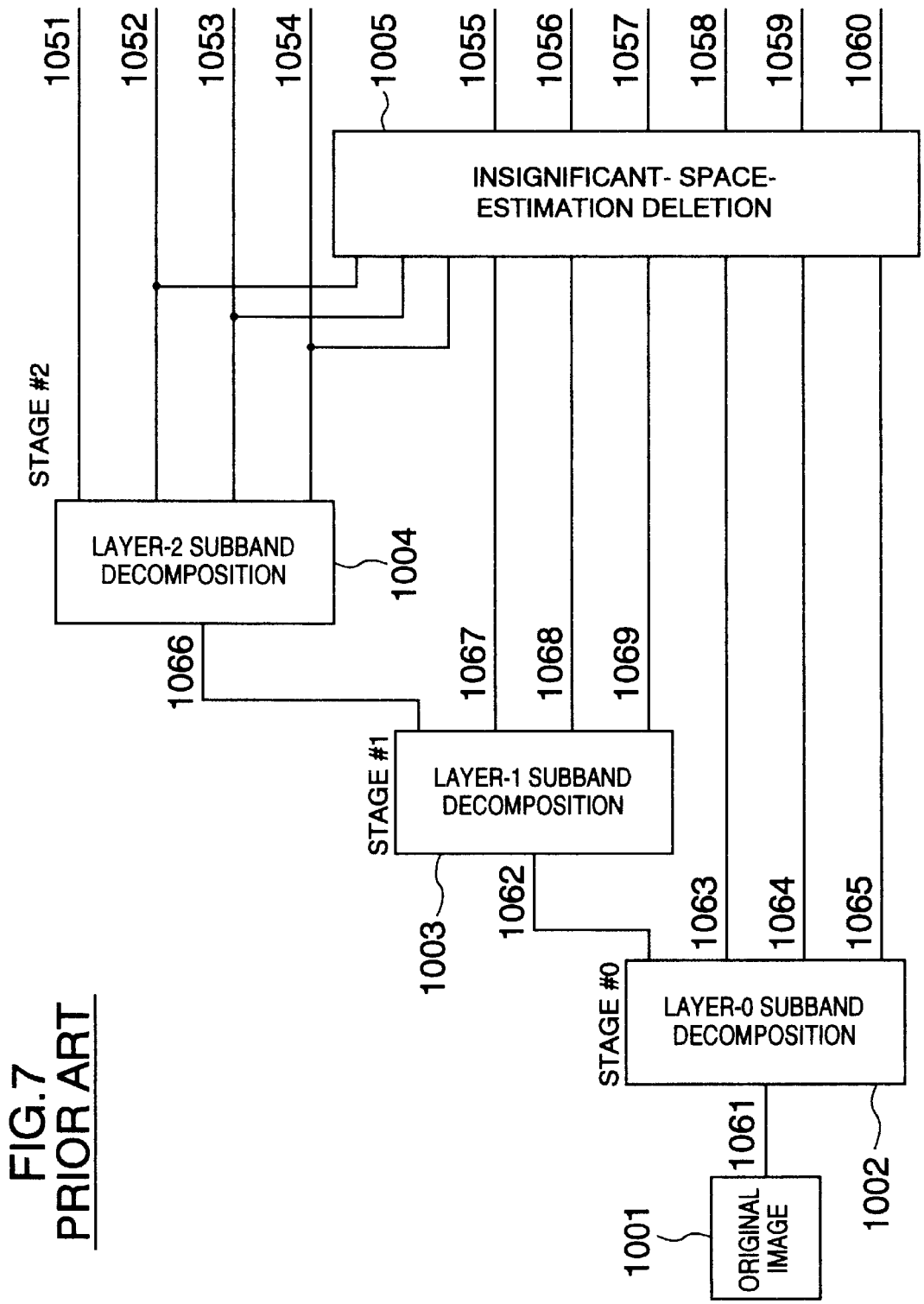
FIG. 7 is a block diagram showing generally and schematically a system configuration of a conventional wavelet image compression system.
Figure 8:
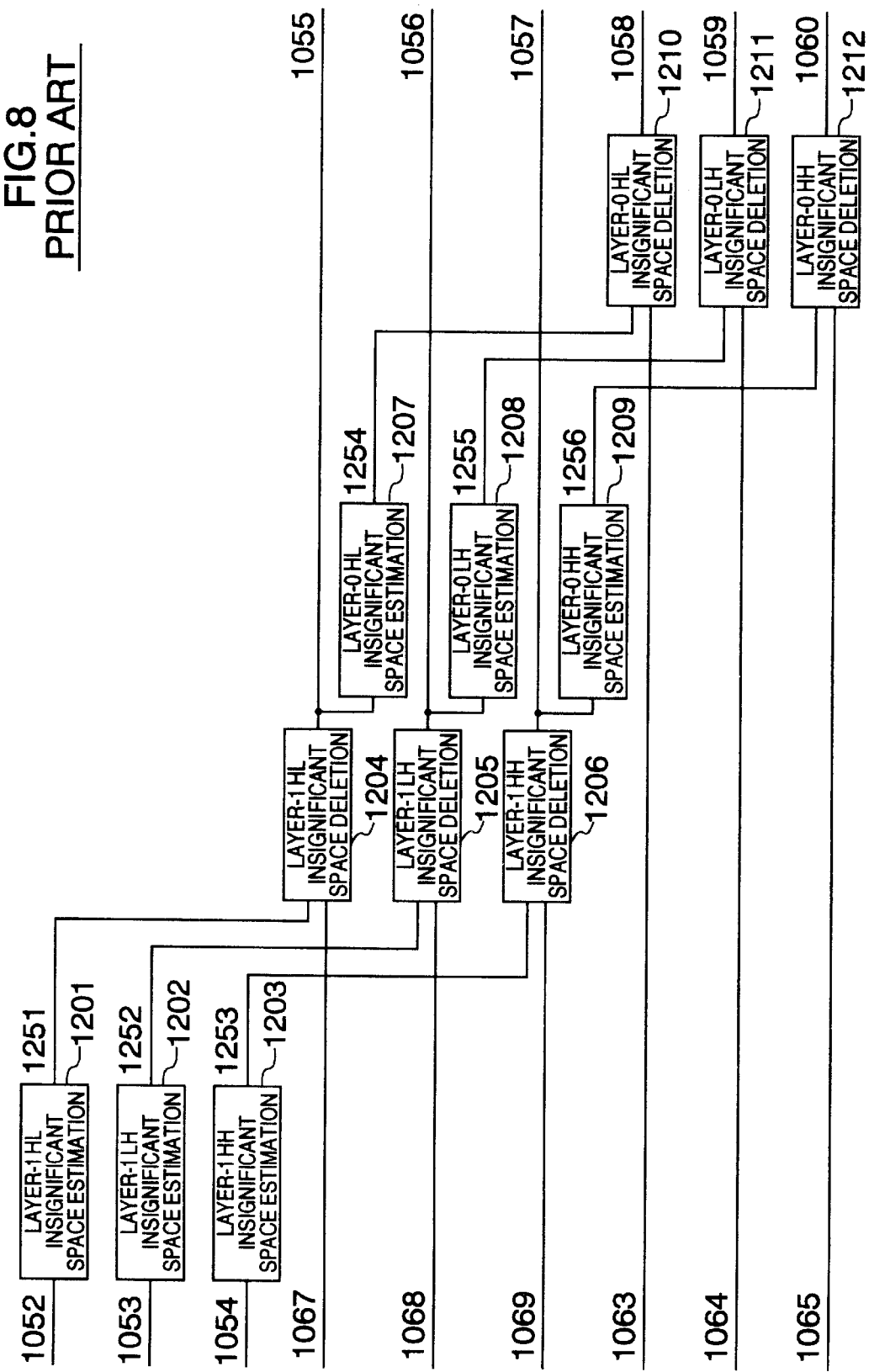
FIG. 8 is a block diagram showing an arrangement of the conventional insignificant-space-estimation deletion unit.
Figure 9:
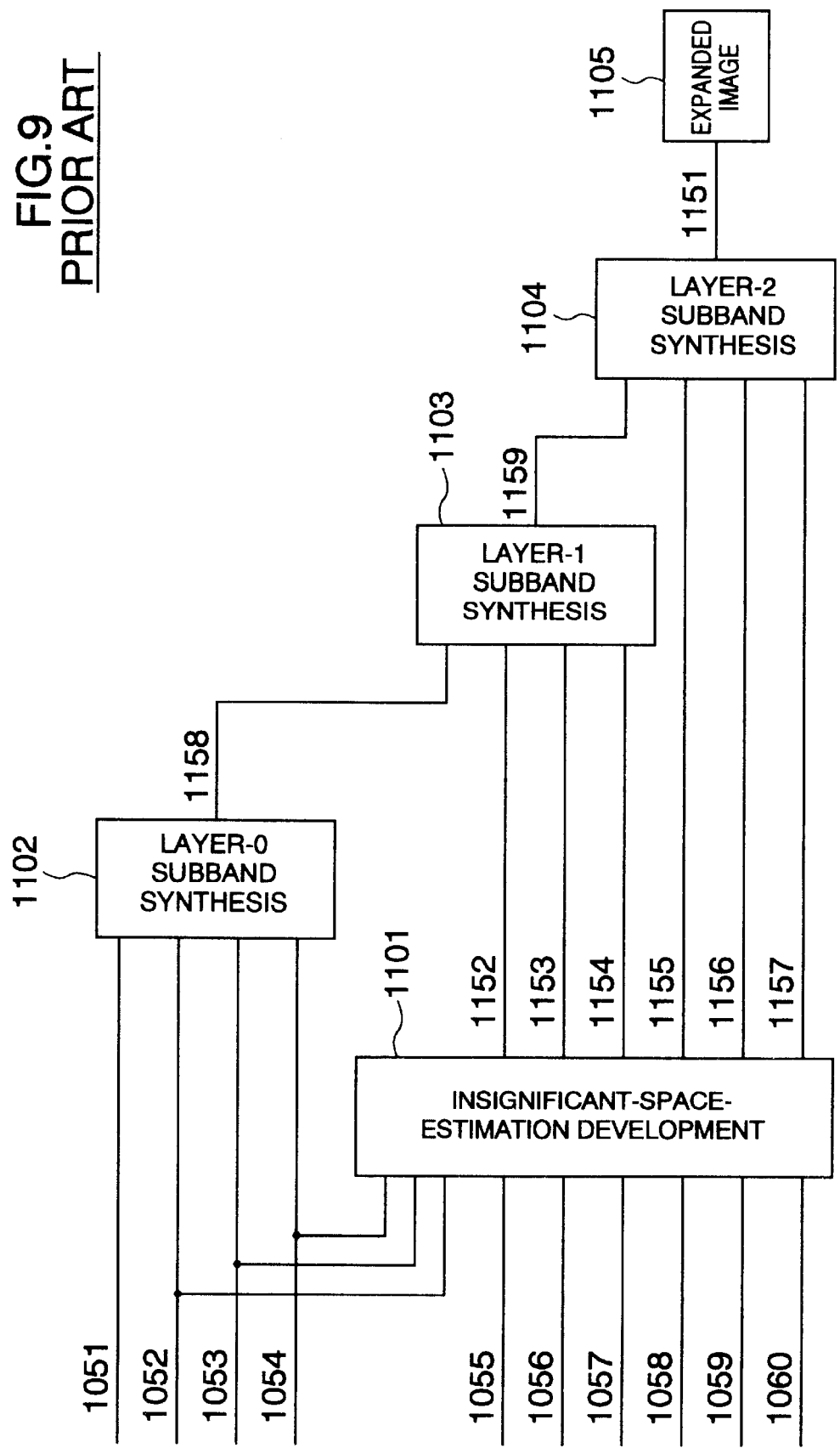
FIG. 9 is a block diagram showing schematically a structure of a conventional wavelet image expansion system.
Figure 10:
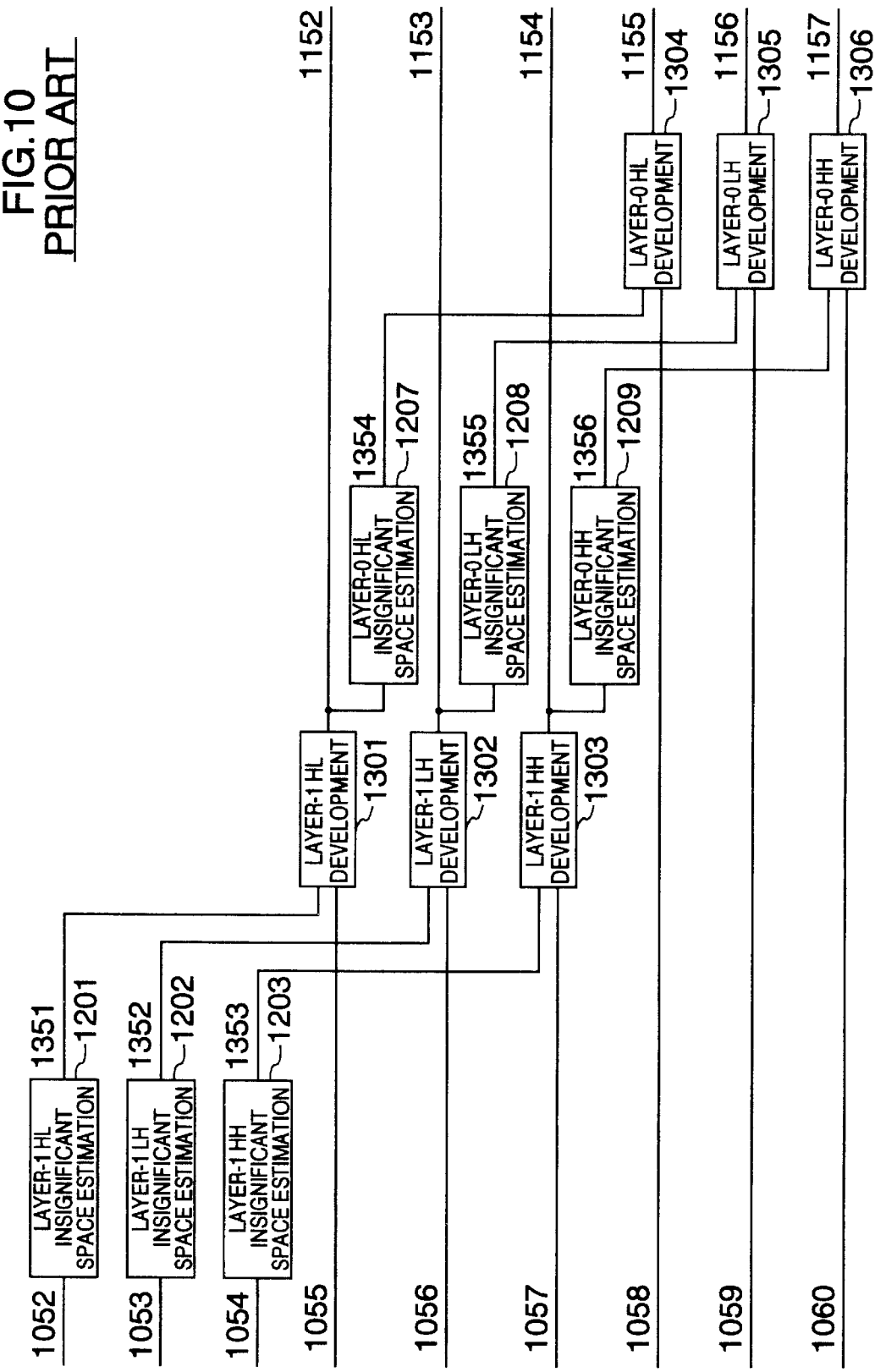
FIG. 10 is a block diagram showing schematically a structure of the conventional insignificant-space-estimation development unit.
Figure 11:
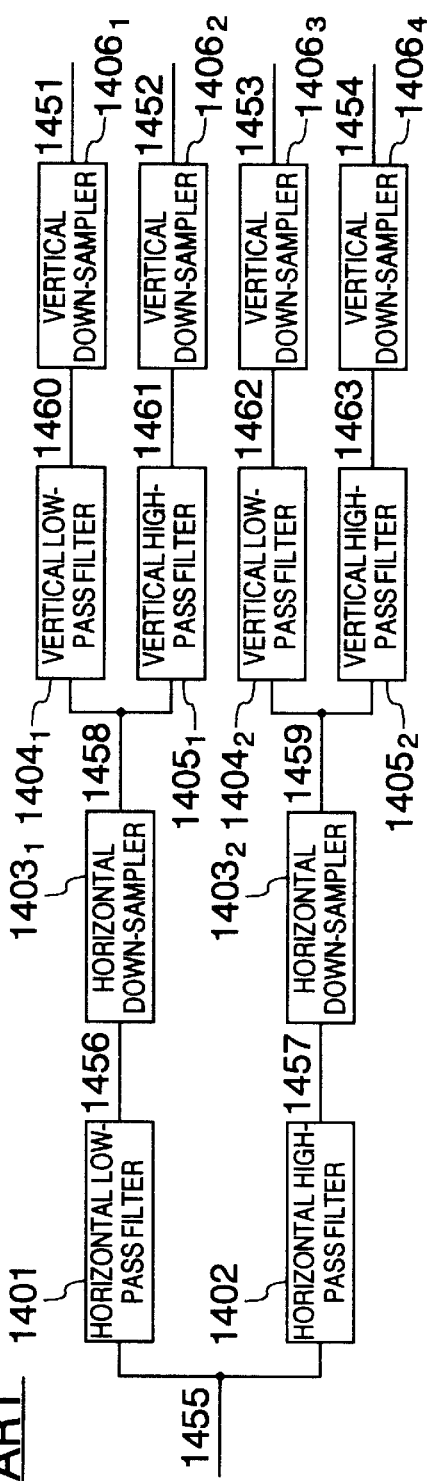
FIG. 11 is a block diagram showing representatively a structure of the subband decomposition unit shown in FIG. 7.
Figure 12:
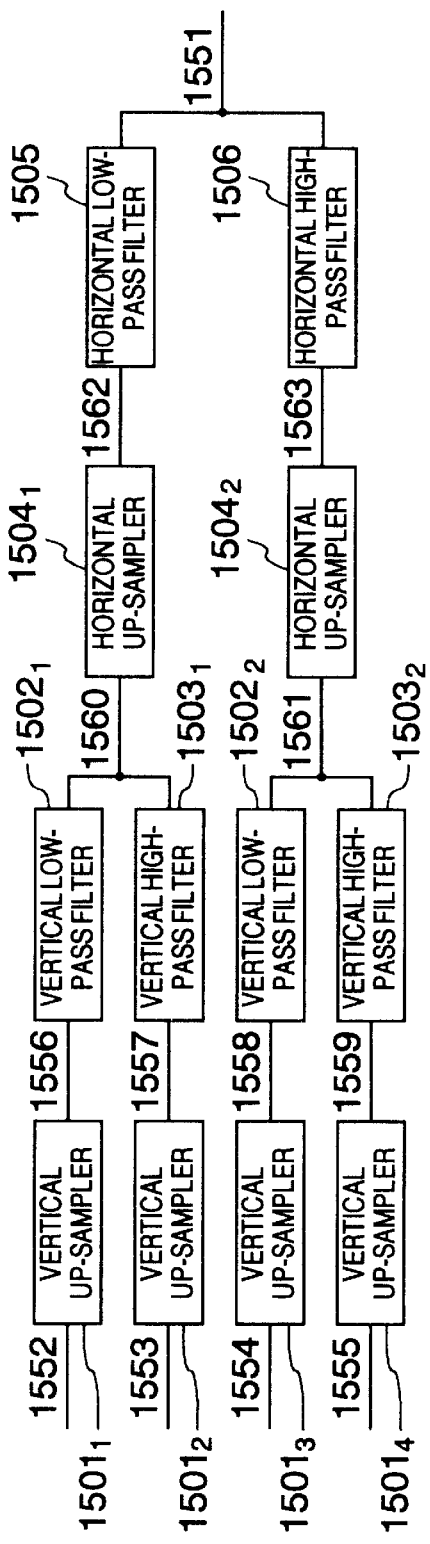
FIG. 12 is a block diagram showing schematically a structure of a conventional subband synthesis unit.

FIG. 6 is a view for illustrating operation of a significance attribute data adding module according to the embodiment of the present invention. Reference numeral 1609 designates a layer-2 HL wavelet space, and 1603 designates a layer-0 HL wavelet space. Reference numeral 501 designates layer-0 HL fault significance data, and 502 designates layer-2 estimation reference data.

Now, description will be directed to coding or encoding processing according to the instant embodiment. Upon the reception of the original image data 1061, the layer-0 subband decomposition unit 1002 performs the wavelet transformation to generate the wavelet data of layer-0 (i.e., the-layer-0 DC data 1062, layer-0 HL data 1063, layer-0 LH data 1064 and the layer-0 HH data 1065).

The layer-1 subband decomposition unit 1003 performs the wavelet transformation on the layer-0 DC data 1062 as received, to thereby generate the wavelet data of layer-1 (i.e., the layer-1 DC data 1066, layer-1 HL data 1067, layer-1 LH data 1068 and the layer-1 HH data 1069).

The layer-2 subband decomposition unit 1004 performs the wavelet transformation on the layer-1 DC data 1066 as received, to thereby generate the wavelet data of layer-2 (i.e., the layer-2 DC data 1051, layer-2 HL data 1052, layer-2 LH data 1053 and the layer-2 HH data 1054). At this time point, all of the layer-0 HL significance attribute data 160, the layer-0 LH significance attribute data 161 and the layer-0 HH significance attribute data 162 are negated (i.e., decided to be inactive).

The layer-2 HL data 1052 and the layer-0 HL significance attribute data 160 are then received by the layer-2 HL significant attribute addition module 104. In that case, if the layer-0 HL significance attribute data 160 has been asserted (decided to be active), then the layer-2 HL significant attribute addition module 104 will generate the layer-2 HL compressed data 151 by adding the significance attribute. However, at this time point, the layer-O HL significance attribute data 160 is negated (decided to be inactive). Accordingly, no significance attribute is added. Thus, the layer-2 HL significant attribute addition module 104 generates a copy of the layer-2 HL data 1052 as the layer-2 HL compressed data 151.

Likewise, upon the reception of the layer-2 LH data 1053 and the layer-O LH significance attribute data 161, the layer-2 LH significance attribute addition module 105 generates a copy of the layer-2 LH data 1053 as the layer-2 LH compressed data 152. In a similar manner, upon the reception of the layer-2 HH data 1054 and the layer-O HH significance attribute data 162, the layer-2 HH significance attribute addition module 106 generates a copy of the layer-2 HH data 1054 as the layer-2 HH compressed data 153.

Upon the reception of the compressed data 151–153, 1067–1069, 1063–1065 of the individual layers except for the significance attribute, the insignificant-space-estimation deletion unit 107 performs the data compression by deleting the insignificant spaces. Thereby, the compressed data (i.e., the layer-1 HL compressed data 154, layer-1 LH compressed data 155, layer-1 HH compressed data 156, layer-0 HL compressed data 157, layer-0 LH compressed data 158, and the layer-0 HH compressed data 159) are generated. At the same time, the insignificant-space-estimation deletion unit 107 generates the insignificance decision signal 163 of the layer-2 for the addition of the significance attribute. The deletion of the insignificant spaces is carried out in the manner described below.

In FIG. 2, the insignificant space estimation module 301 receives the layer-2 HL compressed data 151 (layer-2 HL) to perform the threshold value decision. Thereby, the minimum-value-area-estimation in the data of the one-rank lower layer succeeding to the layer-2 HL compressed data 151 (i.e., the layer-1 HL data 1067) is performed to generate the layer-1 HL insignificant space estimation data 351. Through the similar procedure, the insignificant space estimation modules 302 and 303 receive the component wavelet compressed data of the layer-2 (i.e., the layer-2 LH compressed data 152 and the layer-2 HH compressed data 153) to perform the minimum-value-area estimation in the data of the one-rank lower layer. Thereby, the layer-1 LH insignificant space estimation data 352 and the layer-1 HH insignificant space estimation data 353 are generated. Then, the estimation-result logical-ORing module 304 performs the logical ORing operation on the layer-1 HL insignificant space estimation data 351, the layer-1 LH insignificant space estimation data 352 and the layer-1 HH insignificant space estimation data 353 as received. Thereby, an insignificance decision signal 163 indicating the event of data deletion through the insignificant space prediction is generated.

Subsequently, upon the reception of the layer-1 HL insignificant space estimation data 351 and the layer-1 HL data 1067, the layer-1 HL deletion module 1204 deletes data of the insignificance-estimated area to generate the layer-1 HL compressed data 154. Likewise, the layer-1 LH compressed data 155 and the layer-1 HH compressed data 156 are generated on the basis of the layer-1 LH data 1068 and the layer-1 HH data 1069 as well as the layer-1 LH insignificant space estimation data 352 and the layer-1 HH insignificant space estimation data 353.

The insignificant space estimation modules 1207–1209 receives the layer-1 compressed data 154–156 to perform the minimum-value-area estimation in the data in the one-rank lower layer (i.e., the layer-0). Thereby, the insignificant space estimation data 354–356 are generated.

In succession, upon the reception of the layer-0 HL insignificant space estimation data 354 and the layer-0 HL data 1063, the layer-0 HL insignificant space deletion module 1210 deletes data in the insignificance-estimated area to generate the layer-0 HL compressed data 157. Similarly, the compressed data 158 and 159 of the layer-0 are generated on the basis of the layer-0 LH data 1064 and the layer-0 HH data 1065 as well as the insignificant space estimation data 355 and 356 of the layer-0. Thereby, the insignificant spaces in the wavelet data are deleted. Through the operations described above, the compression of the image data can be accomplished.

The insignificance decision signal 163 generated by the insignificant-space-estimation deletion unit 107 is supplied to error-estimation detection modules 101–103 of the layer-0. In FIG. 1, upon the reception of the insignificance decision signal 163 and the layer-0 HL data 1063, the layer-0 HL error-estimation detection module 101 performs the detection of the significant data in the insignificance-estimated space. Thereby, the layer-0 HL significance attribute data 160 is generated. Likewise, upon the reception of the insignificance decision signal 163 and the layer-0 LH data 1064, the layer-0 LH error-estimation detection module 102 performs the detection of the significant data in the insignificance-estimated space. Thereby, the layer-0 LH significance attribute data 161 is generated. In a similar manner, upon the reception of the insignificance decision signal 163 and the layer-0 HH data 1065, the layer-0 HH error-estimation detection module 103 performs the detection of the significant data in the insignificance-estimated space. Thereby, the layer-0 HH significance attribute data 162 is generated.

At this juncture, description will be made of the operation for detecting the significant data in the insignificance-estimated space by taking as example the operation of the layer-0 HL error-estimation detection module 101. When the value of the layer-0 HL data 1063 is not smaller than a given threshold value and when the insignificance decision signal 163 indicates that an insignificant space has been estimated, then data fault is decided. Thereby, the layer-0 HL significance attribute data 160 is asserted (decided to be active). FIG. 3 is a view for illustrating the detection of the significant data in the significance-estimated space and the addition of the significance attribute.

The layer-0 HL significance attribute data 160 and the layer-2 HL data 1052 are received by the layer-2 HL significant attribute addition module 104. In that case, if the layer-0 HL significance attribute data 160 has been asserted (decided to be active), then the layer-2 HL significant attribute addition module 104 generates the layer-2 HL compressed data 151 affixed with the significance attribute by adding the significance attribute to the layer-2 HL data 1052. In FIG. 3, hatched areas of the layer-0 HL significance attribute data 160 represent the asserted portions thereof.

Through the similar procedure, the layer-2 LH significance attribute addition module 105 receives the layer-0 LH significance attribute data 161 and the layer-2 LH data 1053 to generate the layer-2 LH compressed data 152. The layer-2 HH significance attribute addition module 106 receives the layer-0 HH significance attribute data 162 and the layer-2 HH data 1054 to generate the layer-2 HH compressed data 153. With the above-mentioned operation, the image data is compressed.

Next, description will be directed to the decoding processing by reference to FIG. 4. When the compressed data 151-159 and 1501 of the individual layers are supplied, the insignificant-space-estimation development unit 201 performs the decoding of the data compressed by deleting the insignificant spaces. Thereby, the layer-1 HL expanded data 256, the layer-1 LH expanded data 257, the layer-1 HH expanded data 258, the layer-0 HL expanded data 260, the layer-0 LH expanded data 261 and the layer-0 HH expanded data 262 are generated.

Now, description will turn to the decode processing of the data compressed by the deletion of the insignificant space. FIG. 5 is a block diagram showing a structure of the insignificant-space-estimation development unit 201. In FIG. 5, upon the reception of the layer-2 HL compressed data 151, the insignificant space prediction module 301 estimates the minimum value area in the layer-2 HL wavelet space 1609 on the basis of the threshold value and the significance attribute. Thereby, the layer-1 HL insignificant space development estimation data 451 is generated. Similarly, upon the reception of the layer-2 LH compressed data 152 and the layer-2 HH compressed data 153, the insignificant space estimation module 302 and the insignificant space estimation module 303 generate the layer-1 LH insignificant space development estimation data 452 and the layer-1 HH insignificant space development estimation data 453, respectively.

Upon the reception of the layer-1 HL insignificant space development estimation data 451 and the layer-1 HL compressed data 154, the layer-1 HL development module 1301 embeds the minimum value in the insignificance-estimated area to generate the layer-1 HL expanded data 256. Similarly, upon the reception of the layer-1 LH insignificant space development estimation data 452 and the layer-1 LH compressed data 155, the layer-1 LH development module 1302 embeds the minimum value in the insignificance-estimated area to generate the layer-1 LH expanded data 257. Upon the reception of the layer-1 HH insignificant space development estimation data 453 and the layer-1 HH compressed data 156, the layer-1 HH development module 1303 embeds the minimum value in the insignificance-estimated area to generate the layer-1 HH expanded data 258.

Upon the reception of the layer-1 HL expanded data 256, the insignificant space estimation module 1207 performs the minimum-value-area estimation in the layer-1 HL wavelet space 1606 through the threshold value decision to generate the layer-0 HL insignificant space development estimation data 454. Likewise, upon the reception of the layer-1 LH expanded data 257, the insignificant space estimation module 1208 generates the layer-0 LH insignificant space development estimation data 455. Upon the reception of the layer-1 HH expanded data 258, the insignificant space estimation module 1209 generates the layer-0 HH insignificant space development estimation data 456.

Upon the reception of the layer-0 HL insignificant space development estimation data 454 and the layer-0 HL compressed data 157, the layer-0 HL development module 1304 fills the insignificance-estimated area with the minimum value to generate the layer-0 HL expanded data 260. Similarly, upon the reception of the layer-0 LH insignificant space development estimation data 455 and the layer-0 LH compressed data 158, the layer-0 LH development module 1305 generates the layer-0 LH expanded data 261 to perform the decoding of the wavelet data. Upon the reception of the layer-0 HH insignificant space development estimation data 456 and the layer-0 HH compressed data 159, the layer-0 HH development module 1306 generates the layer-0 HH expanded data 262 to perform the decoding of the wavelet data.

Referring to FIG. 4, the HL significance attribute separating module 202 receives the layer-2 HL compressed data 151 to generate the layer-2 HL significance-attribute-estimated data 252 (i.e., the data from which the significance attribute has been deleted). Similarly, the LH significance attribute separating module 203 receives the layer-2 LH compressed data 152 to generate the layer-2 LH significance-attribute-estimated data 253. The HH significance attribute separating module 204 receives the layer-2 HH compressed data 153 to generate the layer-2 HH significance-attribute-estimated data 254.

The layer-0 subband synthesis unit 1102 receives the layer-2 wavelet data (i.e., the layer-2 DC data 1051, layer-2 HL significance-attribute-estimated data 252, layer-2 LH significance-attribute-estimated data 253 and the layer-2 HH significance-attribute-estimated data 254) to perform the reverse wavelet transformation. Thereby, the layer-1 DC expanded data 255 is generated. The layer-1 subband synthesis unit 1103 receives the layer-1 wavelet data (i.e., the layer-1 DC expanded data 255, layer-1 HL expanded data 256, layer-1 LH expanded data 257 and the layer-1 HH expanded data 258) to perform the reverse wavelet transformation. Thereby, the layer-0 DC expanded data 259 is generated. The layer-2 subband synthesis unit 1104 receives the layer-0 wavelet data (i.e., the layer-0 DC expanded data 259, layer-0 HL expanded data 260, layer-0 LH expanded data 261 and layer-0 HH expanded data 262) to perform the reverse wavelet transformation. Thereby, the expanded image data 251 is generated.

With the processing described above, the expansion of the image data can be accomplished.

As will now be understood from the foregoing description, the image data processing method and the image data processing system according to the present invention are arranged in the following manner. Upon the prediction of the space in which the significant data of the high-frequency data after the subband division exists, when some significant data exists in the space estimated as the insignificant space, the significance indicating attribute is affixed to the insignificance-decided space corresponding to the space in which the significant data exists, and the insignificant space to be compressed is re-estimated on the basis of the threshold value and the significance attribute of the insignificance-decided space affixed with the significance attribute. Thereby, it is possible to delete the insignificant space in the high-frequency data with high accuracy, to impart the positive correlation to the wavelet transformed data having no correlation to the frequency direction, and to predict the significant space of the high frequency with high accuracy on the basis of the frequency correlation. Thus, the insignificant area can be estimated with the enhanced estimation accuracy, which in turn makes it possible to compress the image data effectively and efficiently while protecting the image quality against degradation or deterioration.

Many features and advantages of the present invention are apparent from the detailed description and thus it is intended by the appended claims to cover all such features and advantages of the method and the system which fall within the true spirit and scope of the invention. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. An image data processing system, comprising:
insignificant space estimation means for predicting a significant/insignificant space in a high-frequency subband on the basis of a low-frequency subband signal in a wavelet space;
deletion means for deleting (masking) data in the insignificant space which is predicted by said insignificant space estimating means, said data being contained in said high-frequency subband;
error-estimation detection means for detecting presence of significant data in the space predicted to be insignificant by said insignificant space estimation means; and
means for adding to output data a significance attribute indicating that significant data exists in the space detected by said error-estimation detection means.

2. An image data processing system, comprising:
a plurality of subband division units for performing stages of subband divisions on an image data to be compressed;
insignificant space estimation means for predicting a significant/insignificant space in a high-frequency subband on the basis of a low-frequency subband signal in a wavelet space;
deletion means for deleting (masking) data in the insignificant space which is predicted by said insignificant space estimating means, said data being contained in said high-frequency subband;
error-estimation detection means for detecting presence of significant data in the space predicted to be insignificant by said insignificant space estimation means; and
means for adding a significance attribute, which indicates that significant data exists in the space detected by said error-estimation detection means, to data outputted from the final stage of the subband division unit.

3. An image data processing system, comprising:
a plurality of subband division units for performing stages of subband divisions on an image to be compressed;
HL insignificant space estimation means for receiving HL subband data of a final layer, for performing a minimum-value-area estimation of data in a layer hierarchically lower by one rank than said final layer through threshold value decision, and for outputting data, which indicates a space estimated as the minimum value area, as HL insignificant space estimation data;

LH insignificant space estimation means for receiving LH subband data of the final layer, for performing the minimum-value-area estimation of data in the layer hierarchically lower by one rank than said final layer through the threshold value decision, and for outputting data, which indicates a space estimated as the minimum value area, as LH insignificant space estimation data;

HH insignificant space predicting means for receiving HH subband data of the final layer, for performing the minimum-value-area estimation of data in the layer hierarchically lower by one rank than said final layer through the threshold value decision, and for outputting data, which indicates a space estimated as the minimum value area, as HH insignificant space estimation data;

estimation-result logical-ORing means for logically ORing said HL insignificant space estimation data, said LH insignificant space estimation data and said HH insignificant space estimation data, and for generating an insignificance decision signal indicating occurrence of data deletion due to an insignificant space prediction;

deletion means for deleting (masking) data in the insignificant space predicted by said insignificant space estimation means, said data being contained in said high-frequency subband;

error-estimation detection means for detecting presence of significant data in the space decided to be insignificant by the relevant insignificant space estimation means on the basis of said insignificance decision signal from said estimation-result logical-ORing means; and means for adding a significance attribute, which indicates that significant data exists in the space detected by said error-estimation detection means, to data outputted from said subband division means at the final stage.

4. An image data processing system, comprising:

estimation means for estimating a code-deletion-destined insignificant space on the basis of threshold value decision of an insignificance-decided space and significance attribute indicating presence of significant data;

estimation development means for embedding insignificant data in a space decided to be insignificant by said estimation means, and for developing data generated through a coding processing method over areas except for the insignificant space; and a plurality of subband synthesis means for restoring image data by performing subband synthesis on relevant subband data generated by said estimation development means.

5. An image data coding method, comprising the steps of:

performing subband division through wavelet transformation on image data to be compressed;

estimating an insignificant space to be compressed on the basis of a threshold value of insignificant space in a wavelet space resulting from said subband division;

detecting whether or not significant data exists in the space estimated to be insignificant, adding a significance attribute, which indicates the significant data exists, to an insignificance-decided space corresponding to the space in which the significant data exists, when said significant data exists in the space estimated as the insignificant space; and re-estimating an insignificant space on the basis of a threshold value and the significance attribute of the insignificance-decided space added with the significance attribute.

6. An image data decoding method, comprising the steps of:

developing an insignificance-decided space of a wavelet space from data generated by said image data coding method described in claim 5;

estimating a succeeding-development-destined insignificant space on the basis of a threshold value of the insignificance-decided space and significance attribute indicating presence of significant data to embed insignificant data in said estimated insignificant space;

developing data over the significant space up to a complete wavelet space; and reconstituting image data through reverse wavelet transformation from the data developed to said wavelet space.

* * * * *